May 2, 1961     C. H. BOOTH     2,982,006
ROTATABLE CUTTING OR ABRADING TOOLS
Filed Feb. 5, 1953
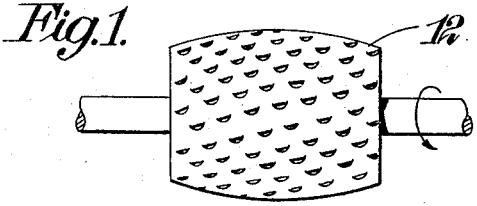
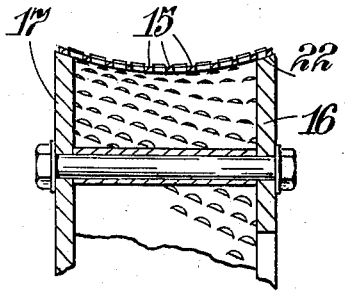
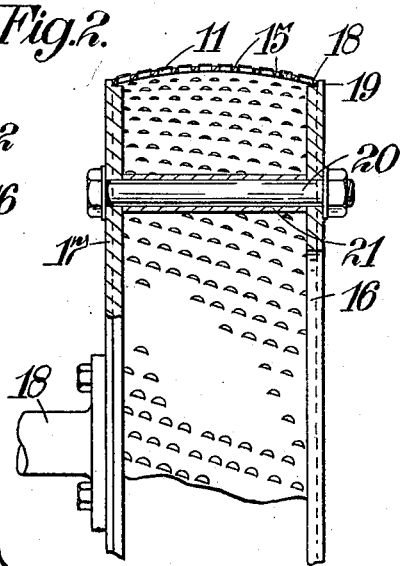
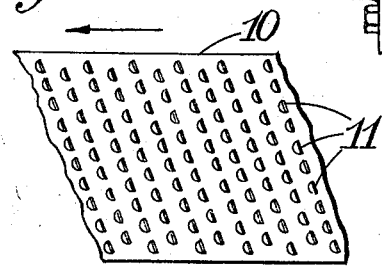
Inventor
Christopher Hodgson Booth
his Attorneys United States Patent Office 2,982,006
Patented May 2, 1961

2,982,006
ROTATABLE CUTTING OR ABRADING TOOLS
Christopher Hodgson Booth, Bath, England, assignor, by mesne assignments, to Simmonds Aerocessories Limited, Pontypridd, Glamorgan, Wales, a corporation of Great Britain
Filed Feb. 5, 1953, Ser. No. 335,269
Claims priority, application Great Britain Feb. 6, 1952
3 Claims. (Cl. 29—78)

The invention relates to cutting or abrading drums and the like.

In specification No. 126,032 I have described a cutting element consisting of a thin flexible sheet or strip having a multiplicity of holes formed therein and hard sharp cutting edges upset from the sheet or strip and each constituted by portions of the edge of a hole. Further in that specification I have described cutting drums made of such cutting elements and I have shown, in Figure 12, a round file or like tool produced by rolling such a cutting element transversely to its length.

Modified forms of the cutting element disclosed in specification No. 126,032, now abandoned, are described in Serial No. 285,672, now Patent No. 2,678,571 granted May 18, 1954.

The cutting elements described above are all deformable by bending in two directions and the present invention takes advantage of this property in the construction of cutting tools having cutting surfaces of double curvature.

The invention provides a cutting or abrading drum consisting of or comprising a cutting element as described above deformed to provide a cutting surface which is curved in the circumferential direction and is also curved or otherwise departs from straight line form, in the axial direction.

Preferably the cutting edges are directed circumferentially. The axial deformation may be convex or concave or both and the cutting edges may be on the inside or the outside of the drum or both.

Two specific constructions of tools according to the invention will now be described, by way of example, with reference to the accompanying drawings in which:

Figure 1 shows a rotatable burr,
Figure 2 is a cross-section through one form of rotatable drum of larger diameter,
Figure 3 shows a modification of the construction shown in Figure 2, and
Figure 4 shows a portion of a cutting strip which may be used in the manufacture of the tools.

In the first example, shown in Figure 1, a flat strip 10 constructed as shown in Figure 4 and having cutting edges 11 as described above is bent to form a short tube 12, the ends of the strip being welded together, and the tube is deformed to barrel shape as shown. The deformation is effected during the formation of the strip or of the tube. The tube is of small diameter and is accordingly sufficiently rigid to be self-supporting without an internal reinforcing structure. The cutting edges 11 are directed circumferentially and the tool constitutes a rotatable burr.

In the construction shown in Figure 2 a strip 10 having cutting edges 11 as described above is bent into a drum 15 of substantial diameter and is also deformed to provide a convex arcuate surface as viewed in section in the circumferential direction (i.e. as shown in the figure). The cutting edges are on the outside. The ends of the strip are welded together. The drum is supported on a hub consisting of two discs 16, 17 carried on a central supporting shaft 18 for rotation. One (or both) of the discs may be cut away within its periphery to provide apertures for swarf clearance. The discs 16, 17 are spaced apart to engage the edges of the drum and each is stepped on its peripheral edge as shown at 18 to provide a seating underlying the edge portion of the drum and a lip 19 engaging the side of the drum to prevent axial movement. The discs are held in their spaced relation by bolts 20 and distance pieces 21 at intervals around the drum.

The construction just described may be modified by deforming the drum 15 to provide a concave arcuate surface as viewed in section and as shown in Figure 3. With this modification the lips on the discs may be omitted and the discs simply chamfered as shown at 22, to fit the underside of the drum.

In each of the above specific constructions the strip is flat (i.e. without the ridges described in specification No. 285,672). It is however within the invention to employ ridged strip as described in that specification. Such ridged material has considerable elasticity in the lengthwise direction, due to the reverse bends, and this elasticity may be employed to assist in retaining the drum on a hub.

I claim:
1. A cutting drum consisting of a thin flexible steel strip bent into drum form and curved in the axial direction of the drum and having a multiplicity of holes formed therein and sharp, linear, cutting edges upset from, and substantially parallel to, the surface of the drum, of which each edge is constituted by portions of the edge of a hole, and faces in the circumferential direction directed towards the hole, each has positive clearance and rake angles relative to the surface of the drum, each harder than the body of the strip, and in which the flexible material is reversely bent into ridges extending axially of the drum and has the cutting edges extending from the tops of the ridges.

2. A drum as claimed in claim 1 in combination with a supporting hub consisting of a shaft and two circular members secured to the shaft in axially spaced relation and engaging within the edges of the drum, the drum being retained on the members by the elasticity resulting from the ridged formation of the drum.

3. A drum in combination with a support consisting of a thin flexible steel strip bent into drum form and curved in the axial direction of the drum and having a multiplicity of holes formed therein and sharp, linear, cutting edges upset from, and substantially parallel to, the surface of the drum, of which each edge is constituted by portions of the edge of a hole, and faces in the circumferential direction directed towards the hole, each has positive clearance and rake angles relative to the surface of the drum, each harder than the body of the strip, said drum being internally convex in the axial direction, in combination with a supporting hub consisting of a shaft and two circular members secured to the shaft in axially spaced relation and engaging within the edges of the drum, the edges of the members being flared to conform with the internal edge portions of the drum, thereby to retain the drum on the hub, and in which the drum is composed of strip material which is reversely bent into ridges extending axially of the drum and has the cutting edges extending from the tops of the ridges.

References Cited in the file of this patent
UNITED STATES PATENTS

| | | |
|---|---|---|
| 895,216 | Wagner | Aug. 4, 1908 |
| 1,054,656 | McFeeby | Feb. 25, 1913 |
| 1,820,377 | Curtis | Aug. 25, 1931 |
| 2,358,109 | Simon | Sept. 12, 1944 |
| 2,678,571 | Booth | May 18, 1954 |
| 2,769,225 | Booth | Nov. 6, 1956 |

FOREIGN PATENTS

| | | |
|---|---|---|
| 697,773 | France | Nov. 5, 1930 |